Oct. 18, 1932.    K. MAYBACH    1,883,743
CHANGE SPEED GEAR
Filed Aug. 29, 1931    7 Sheets-Sheet 5
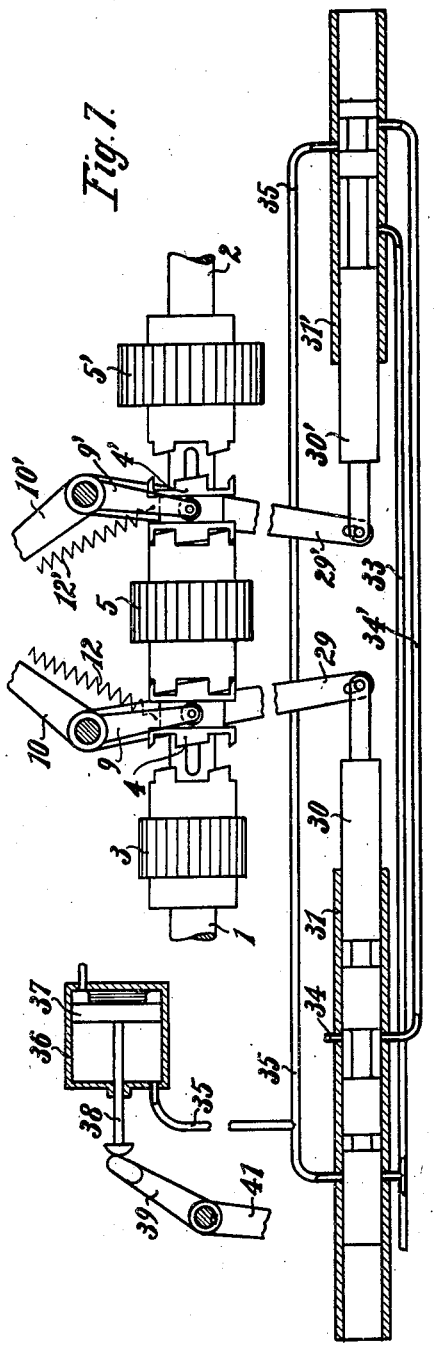
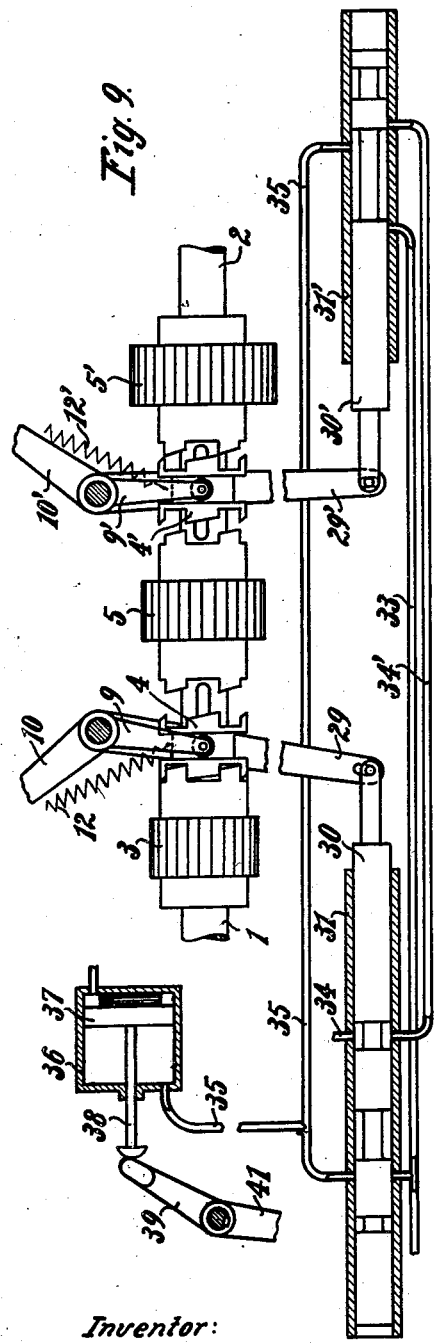
Inventor:
Karl Maybach

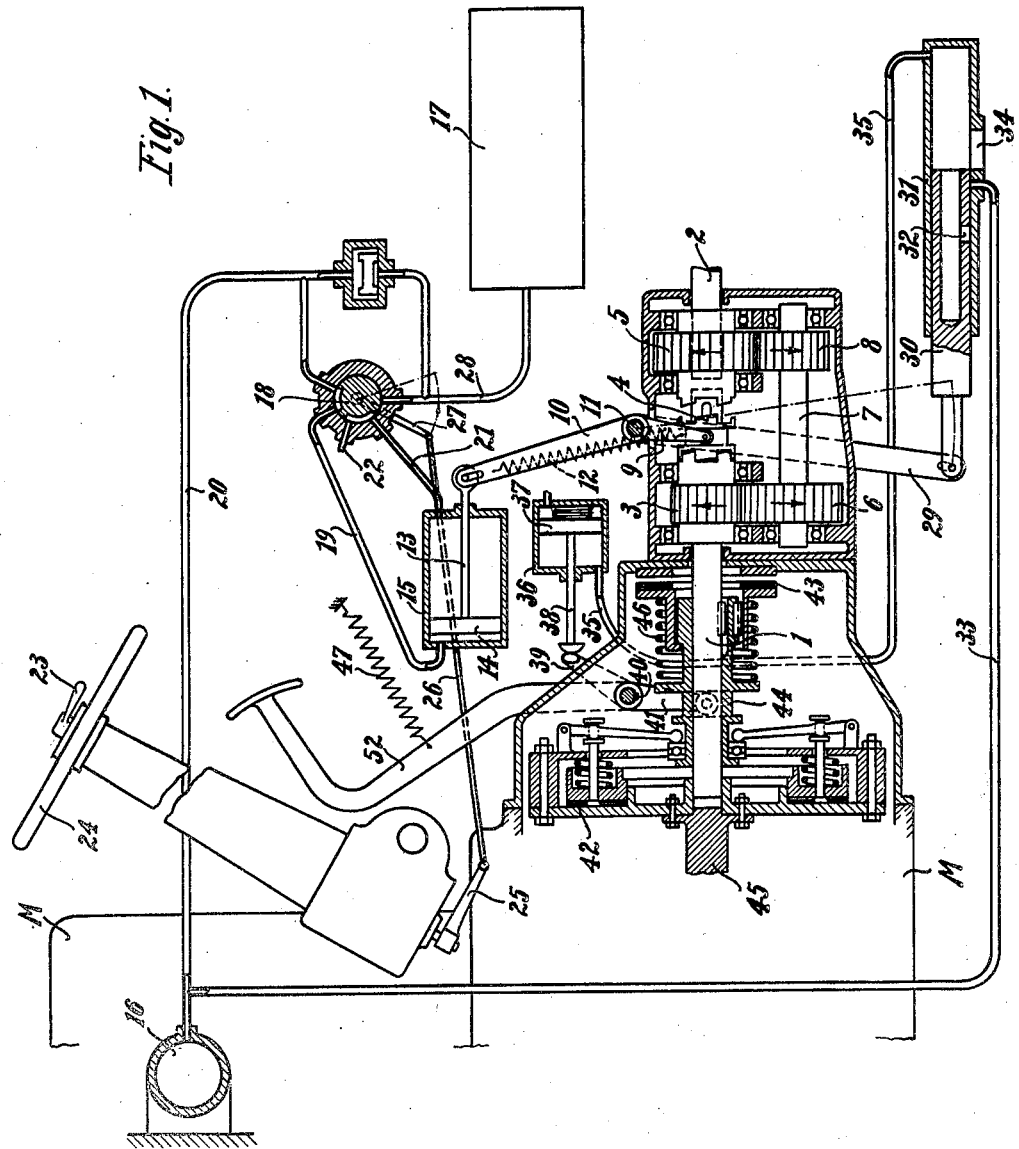

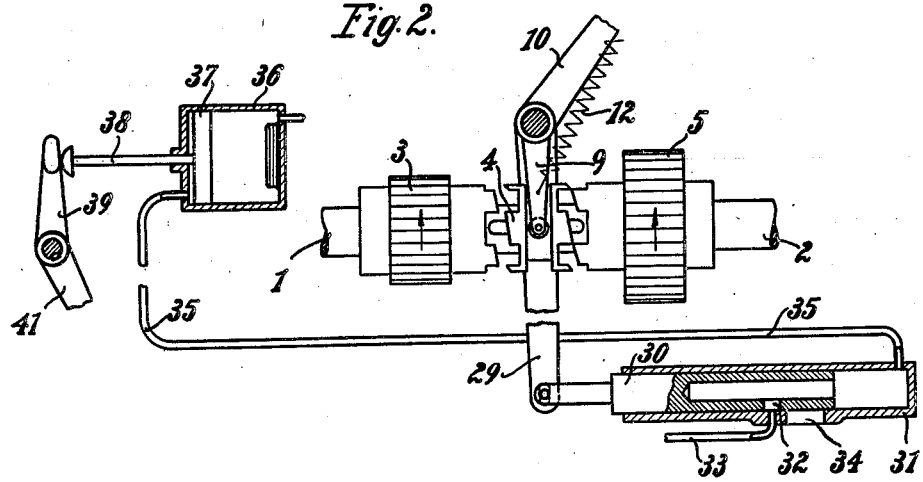
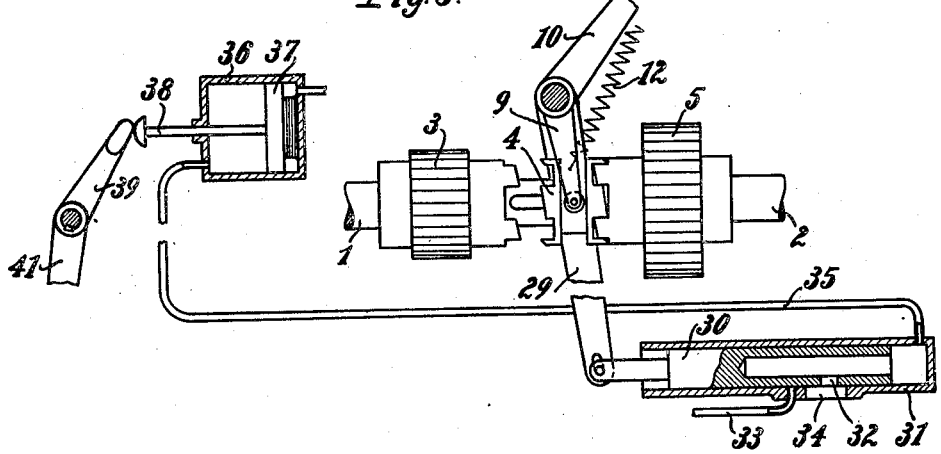

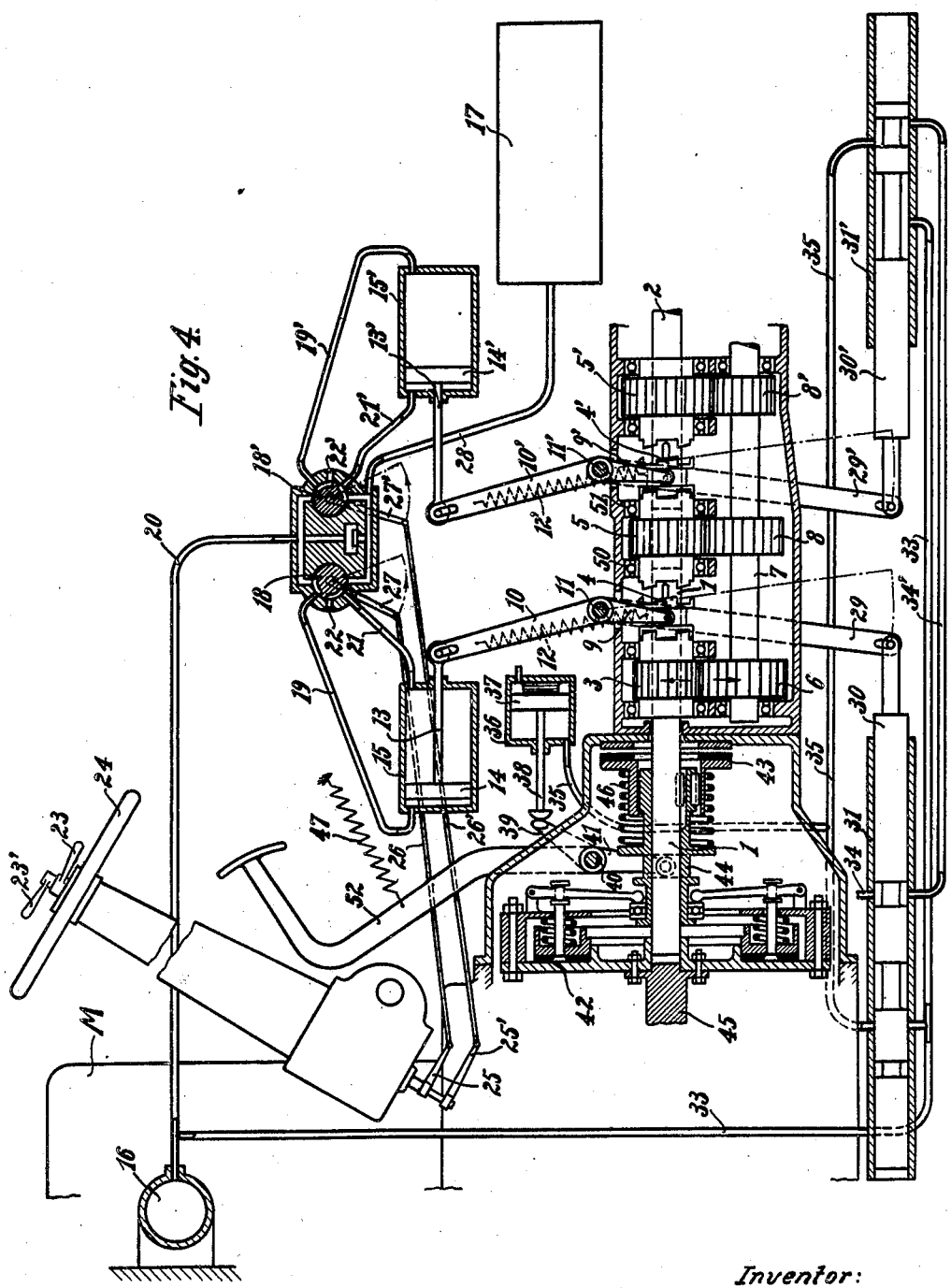

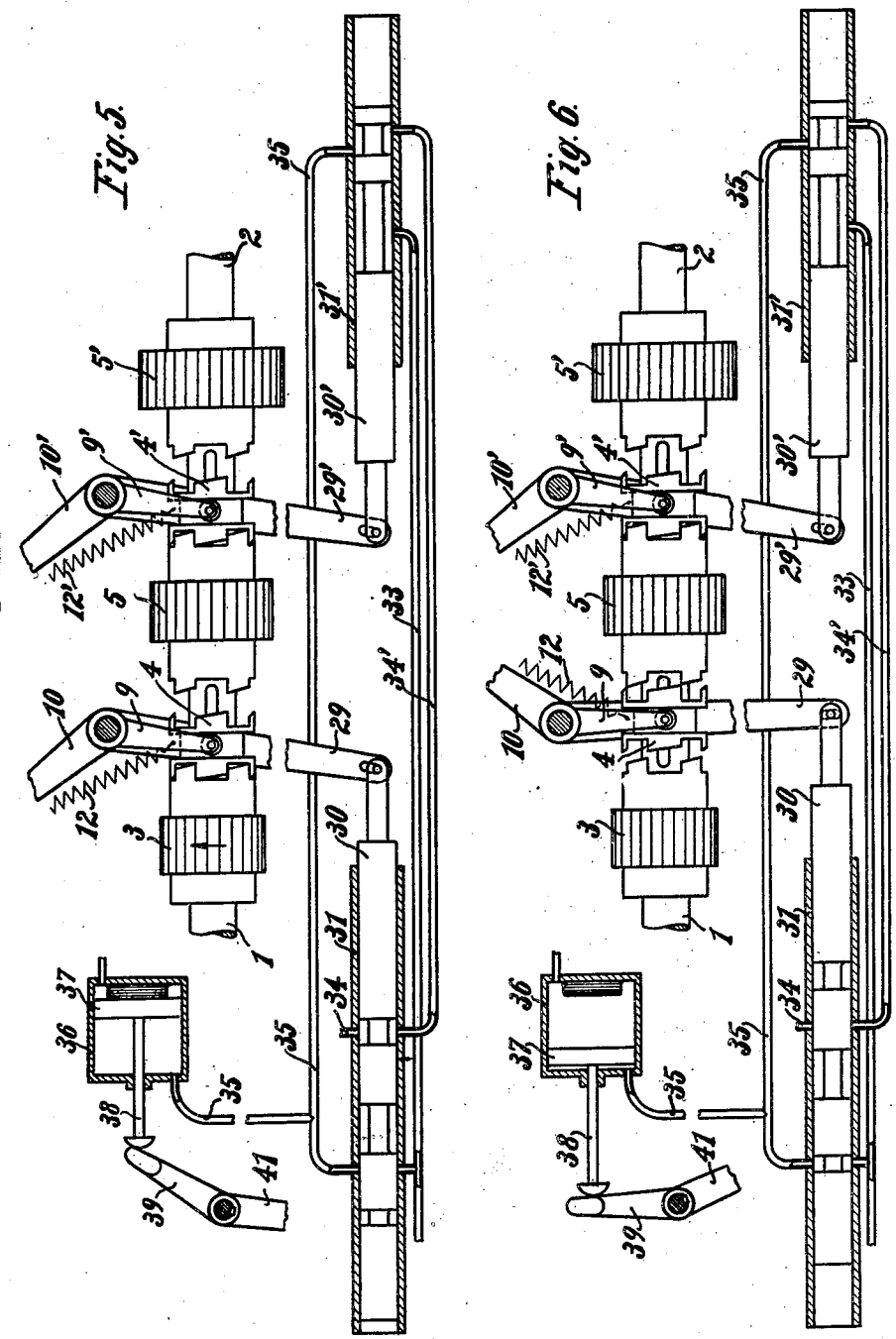

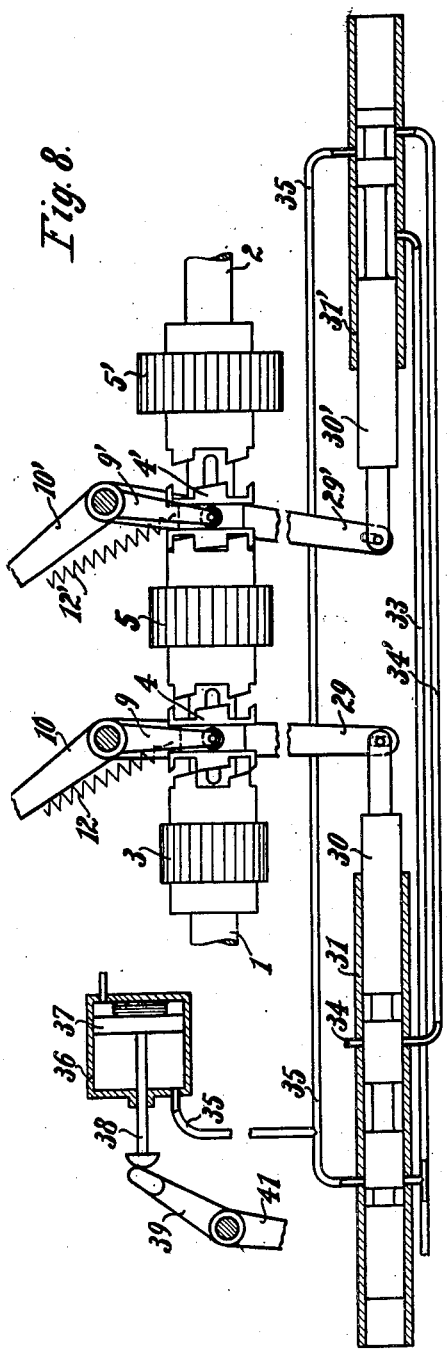

Oct. 18, 1932.　　　K. MAYBACH　　　1,883,743
CHANGE SPEED GEAR
Filed Aug. 29, 1931　　7 Sheets-Sheet 7
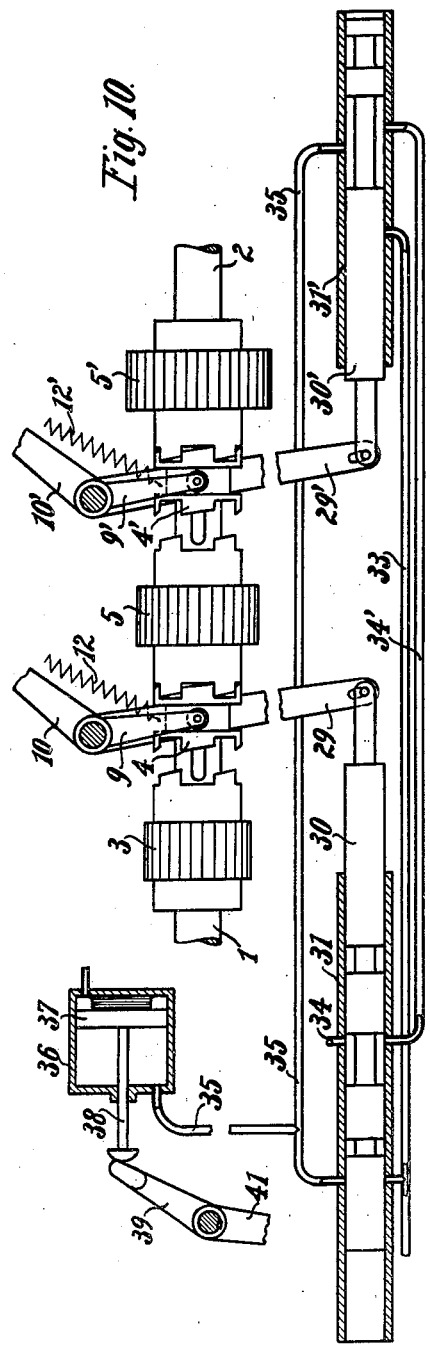
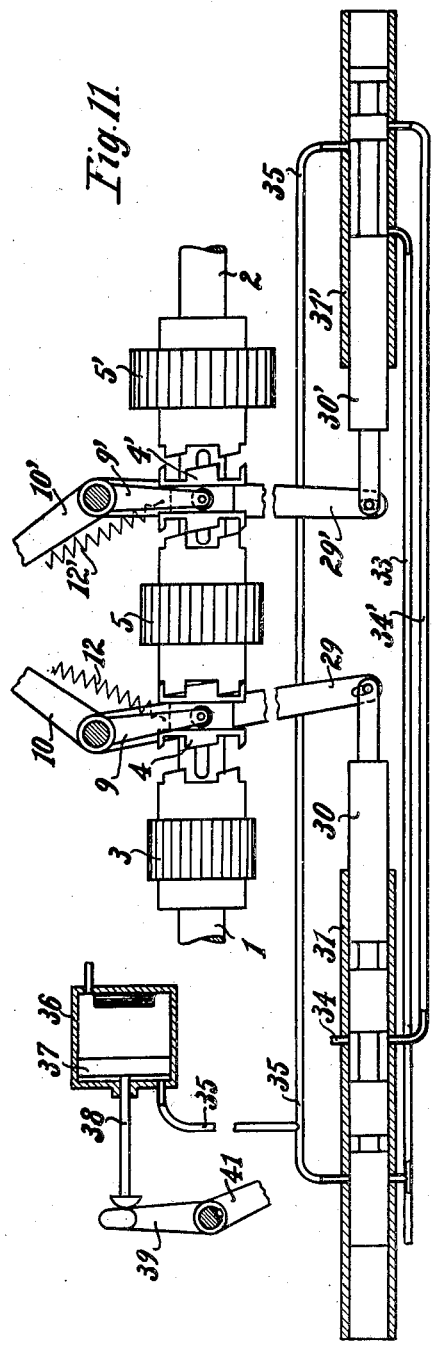
Inventor:
Karl Maybach Patented Oct. 18, 1932

1,883,743

UNITED STATES PATENT OFFICE

KARL MAYBACH, OF FRIEDRICHSHAFEN, GERMANY, ASSIGNOR TO MAYBACH-MOTORENBAU G. M. B. H., OF FRIEDRICHSHAFEN, GERMANY

CHANGE SPEED GEAR

Application filed August 29, 1931, Serial No. 560,174, and in Germany September 6, 1930.

My invention relates to change speed gears especially for motors cars and has special reference to two speed gears of the kind as disclosed in my U. S. Patent Re. 17,707.

In gears of this kind two alternately working special claw clutches are provided having teeth with so inclined front faces that upon setting the speed change and taking the gas off the motor (without disconnecting the main friction clutch between motor and speed gear) the respective clutch halves do not engage but rattle past each other until the originally faster rotating half becomes the slower one or vice versa. Such gears may be used alone or in connection with other change speed gears being provided with any suitable number of speed changes, or combinations of such gears with others may be made.

When driving a car with any of such change speed gears, the driver for example going up a hill intends to change from a slower speed to a faster one, difficulties may arise in that the vehicle and the claw coupling half in driving connection therewith loses speed faster than the motor and the claw coupling half in driving connection therewith which is intended to co-operate with the first mentioned coupling half. Then the two coupling halves would rattle past each other without the possibility of their coming into final engagement.

An object of my invention is to avoid this drawback by providing means for braking the faster running coupling half or the members connected therewith, such means coming into operation as soon as one of the two claw couplings comes out of engagement and before the second claw coupling comes into final engagement, that is during the period of the respective two coupling halves rattling past each other.

The braking means according to my invention are applied to that coupling half and/or the members connected therewith which is more or less in direct driving connection with the motor of the vehicle. For this purpose a friction brake or the like may for example be provided for the purpose of braking the fly wheel of the motor. The braking effect on the faster running coupling half will be the better the smaller the masses are. It may therefore be possible to do without a special brake if the main friction clutch be released so that the friction from the oil in the gear case and the friction from other causes on the small mass of the driving shaft suffices for causing a relative fast reduction in speed of rotation.

The best application of my invention is in connection with automobiles which are provided with a so-called coupling brake; that is a brake acting on the driving shaft of the speed gear whenever the main friction clutch is disconnected for the purpose of changing in speed causing a kind of synchronizing effect in the change speed gear. With transmissions of this kind according to my invention means are provided for disconnecting the main friction clutch automatically during the period when the two coupling halves rattle past each other when changing from the slower to the faster speed.

All this will be understood best when having reference to the drawings which represent examples embodying my invention.

All the figures are mere diagrams.

Fig. 1 is a diagrammatic side elevation showing most of the elements in section. Figs. 2 and 3 represent in section two different positions of the vacuum control member of Fig. 1. In these figures the gears and clutch members are shown in an enlarged scale.

Fig. 4 is again a diagrammatic side elevation like Fig. 1. It represents the application of my invention to a four or more speed change speed gear which is a modified combination of two change speed gears according to Fig. 1. Figs. 5 to 11, inclusive, show different positions of the vacuum control members of Fig. 4 in section.

In the first example a two speed change speed gear is provided which comprises a driving shaft 1 coming from the motor indicated at M and a driven shaft 2. Gear 3 loosely surrounds shaft 1 and by means of sleeve 4 splined to shaft 1 may be connected thereto. For this purpose gear 3 at its right hand side and sleeve 4 at its left hand side are provided with clutch teeth, respectively, these teeth having so inclined front faces that when the co-operating elements approach each other and get into touch—sleeve 4 rotating slower than gear 3 in the direction indicated by the arrow—they do not engage but rattle past each other until the originally faster rotating gear 3 has slowed down and begins to rotate slower than sleeve 4 or until sleeve 4 catches up and begins to rotate faster than gear 3 which can be attained simply by giving gas again after having the gas shut off for perfecting the speed change.

Sleeve 4 at its right hand side is again provided with teeth having inclined front faces which are adapted to cooperate with corresponding teeth on the left hand side of gear 5 fixed to shaft 2. Gear 3 meshes with gear 6 rigidly fixed to countershaft 7 to which also gear 8 is fixed meshing with gear 5. Thus by shifting sleeve 4 to the right the right hand teeth of sleeve 4 get into touch with the teeth of gear 5 but these teeth at first do not engage but rattle past each other because sleeve 4 rotates faster than gear 5 due to the gear dimensions chosen. Final engagement of these teeth will occur as soon as sleeve 4 has slowed down so as to begin to rotate slower than gear 5.

For the purpose of making sure that the desired relative speed of rotation is prevailing between sleeve 4 and gear 3 or gear 5, respectively, means are provided preventing an idling middle position of sleeve 4. In the present example these means comprise two levers 9 and 10 both fulcrumed at 11 and tensioned by means of connecting spring 12. Operating rod 13 is connected to piston 14 adapted to slide in cylinder 15. This piston is caused to move by vacuum which for example may be taken from the motor intake at 16 or from a vacuum storage container 17. I prefer to use for change from lower to higher speed the vacuum resulting from the storage container and for the opposite change the vacuum coming from motor intake. The reasons therefor are explained in my co-pending application Ser. No. 457,233 (series of 1925). Consequently a vacuum control element 18 is provided which serves for connecting pipe line 19 with pipe line 20 and pipe line 21 with pipe line 22, which latter line opens into the open air.

There is a lever 23 mounted on the steering wheel 24 by which lever 25 can be turned so that cock 18 by means of rod 26 and lever 27 is turned into its second position indicated by the dotted lines' position of lever 27. In this position pipe line 19 is connected to pipe line 22 and pipe line 21 to pipe line 28 so that piston 14 is moved to its other end position within cylinder 15.

If we assume that the driver of the car into which the change speed gear is mounted has been driving the car at the lower speed, which means the position represented in Fig. 1 in which rotation from shaft 1 to shaft 2 is performed by means of transmitting gears 3, 6, 8 and 5, and he now wants to change to the other speed, nothing is necessary but to set lever 23 into its other position, to take the gas off the motor, to wait a moment and to give gas again. The effect of these operations is the following:

Turning of lever 23 causes cock 18 to be turned into its second position (dotted lines in Fig. 1) thus causing connection between pipe lines 19 and 22 and between 21 and 28, respectively. In consequence thereof the vacuum of container 17 acts on the right hand side of cylinder 15 so that piston 14 is moved to the right and moves lever 10 to its right hand position also. Spring 12 now tends to withdraw sleeve 4 from its engagement at its left and to move it to its right hand position. But as long as the left hand claw coupling is under load dis-engagement is prevented by the friction resistance between the coupling teeth. As soon as the driver turns the gas off the left hand claw coupling of sleeve 4 dis-engages and sleeve 4 moves to the right and gets in touch with the teeth of gear 5. At the same time lever 29, also fulcrumed at 11 and also in connection with sleeve 4 moves to the right also and shifts member 30 within cylinder 31 to the right as well. We then have the position indicated diagrammatically in Fig. 2: sleeve 4 with its right hand teeth rattles past the slower rotating teeth belonging to gear 5, the aperture 32 of member 30 fits over the end of pipe line 33 connected to the vacuum of intake 16, at the same time aperture 34 of cylinder 31 is closed so that the vacuum coming from intake 16 by means of pipe lines 33 and 35 acts on the left hand side of cylinder 36 causing piston 37 with its rod 38 to be moved to the left. Piston rod 38 pushes against lever 39 fulcrumed at 40. Lever 39 is rigidly connected to lever 41 which again is in rigid connection with main clutch lever 52. Consequently by means of rod 38 moving to the left main clutch mechanism 42 is de-clutched and at the same time friction brake 43 gets into function. All this is caused by sleeve 44 splined to shaft 1 being moved to the right.

Thus shaft 1 is de-clutched from the prime motor shaft 45 and at the same time brake 43 is applied to it so that its speed of rotation decreases rapidly. As soon as this speed has slowed down so far that gear 5 rotates more rapidly than sleeve 4 connection between these two members is effected, as shown in Fig. 3. By the further movement of sleeve 4 to the right lever 29 also moves to the right and causes member 30 to be shifted to the right also. Thereby aperture 32 is moved opposite to aperture 34 and the end of vacuum pipe line 33 is closed. Thus piston 37 is released and spring 46 of brake mechanism 43 causes levers 41 and 39 and rod 38 together with piston 37 to be moved back to their original position. Spring 47 acting on lever 52 works to the same end. Main friction clutch 42 therefore is recoupled, while brake 43 is idling again.

In Fig. 4 two two-speed change speed gears of the design and construction of Fig. 1 are combined to a four or more speed change speed gear.

There is again a motor shaft 45 coming from the motor indicated at M. Main clutch mechanism 42 is adapted to connect to shaft 1. Gear 3 loosely surrounds shaft 1 and meshes with gear 6 rigidly connected to transmission shaft 7. Sleeve 4 is splined to shaft 1 and adapted to connect this shaft alternately with gear 3 or with gear 5. Gear 5 itself is journaled at 50 and 51 and by means of sleeve 4' splined to outgoing shaft 2 can also be connected to this latter shaft. In its other position (right hand) sleeve 4' connects shaft 2 to gear 5' which loosely surrounds shaft 2. Gears 5 and 5' mesh constantly with gears 8 and 8', respectively, both of which are rigidly connected to transmission shaft 7.

It is of course possible to increase the number of speeds of this gear simply by adding gears on the right hand side in any well-known manner. These additional may be so arranged that the shiftable gears are situated on shaft 2 or on shaft 7, as circumstances may afford. All these constructions are well-known and need not be explained in detail or shown in the drawings.

All the elements shown in Fig. 4 correspond to the elements having the same numerals in Fig. 1. The additional elements in Fig. 4 which are added because of the second double claw sleeve 4' and because of the third gear pair 5'/8' are drawn in exactly similar manner and indicated by the same numerals only marked with the sign (').

The different positions of the members are shown in Figs. 5 to 11, inclusive. In these figures the wheels and clutch members are shown in an enlarged scale.

The position given in Fig. 5 corresponds to the position shown in Fig. 4. In Fig. 6 lever 10 by means of vacuum cylinder 15 was moved to its right hand position and spring 12, after the gas was shut off, has moved levers 9 and 29 to the right also. The right hand teeth of sleeve 4 are rattling past the left hand teeth of gear 5. Member 30 by means of lever 29 was moved to the right and has caused connection between pipe lines 33 and 35 so that the vacuum of intake 16 moves piston 37 to the left and causes the de-clutching of main clutch 42 and at the same time the actuation of brake 43.

In Fig. 7 the braking of shaft 1 together with sleeve 4 has caused final engagement of sleeve 4 with gear 5 and the corresponding further movement of member 30 to the right has again eliminated the influence of the vacuum on piston 37 so that it has moved back to its right hand position under the tension of springs 46 and 47. Consequently, the brake 43 was released and the main clutch 42 was re-coupled.

If lever 10 is moved backward to its left hand position after the gas supply to the motor has been cut off, sleeve 4 moves to the left also. Member 30 at the same time is caused to move to the left. But the position in which connection is caused between pipe lines 33 and 35 is passed so suddenly (because sleeve 4 under the tension of spring 12 moves at once to the position in which the left hand teeth of sleeve 4 rattle past the right hand teeth of gear 3) that the vacuum of intake 16 cannot have any effect on piston 37. Consequently this time main clutch 42 is not de-clutched and brake 43 is not actuated. The corresponding positions of the members are represented in Fig. 8.

The working of the members when lever 10' is operated instead of member 10 is perfectly analogous. The different positions are shown in Figs. 9, 10 and 11. Fig. 9 corresponds to Fig. 6, Fig. 10 to Fig. 7 and Fig. 11 to Fig. 8.

I do not want to be limited to the details described or shown in the drawings as many variations will occur to those skilled in the art.

What I claim is:

1. A change speed gear comprising a driving shaft and a driven shaft; means for driving said driven shaft at speeds of rotation different from the speed of rotation of said driving shaft, said means comprising at least two pairs of constantly meshing gear wheels; means for braking said driving shaft; means for causing a change in the speed of rotation of said driven shaft; and means in operative connection with said changing means adapted to cause braking of said driving shaft whenever a speed change from a slower to a faster speed of said driven shaft is perfected.

2. A change speed gear driven by a motor comprising a driving shaft and a driven shaft; a gear train adapted to drive said driven shaft at a speed of rotation different from the speed of rotation of said driving shaft, said gear train including two pairs of constantly meshing gears; means for de-clutching said driving shaft from the driving motor; means for braking said driving shaft when de-clutched from the motor; means for causing a speed change of said driven shaft relative to said driving shaft; and means in operative connection with said speed changing means adapted to cause de-clutching of said driving shaft from the motor and braking of said driving shaft whenever a speed change from a slower to a faster speed of said driven shaft is perfected.

3. A change speed gear driven by a motor comprising a driving shaft and a driven shaft; a gear train including a pair of constantly meshing gears; two claw couplings inserted between said two gear pairs, said claw couplings being provided with teeth having so inclined front faces that final engagement of the co-operating coupling halves is prevented so long until the originally faster rotating coupling half becomes the slower one and vice versa; a friction clutch between said motor and said driving shaft; a brake on said driving shaft adapted to operate when said friction clutch is released; means of alternately operating said claw couplings; and means in operative connection with said means for operating said claw couplings adapted to cause release of said friction clutch and operation of said brake whenever a speed change from a slower to a faster speed of said driven shaft is perfected.

4. A change speed gear driven by a motor comprising a driving shaft and a driven shaft; a gear train comprising three pairs of constantly meshing gears; four claw couplings, two of said claw couplings being inserted between the first and the second pair of said constantly meshing gears and the other two of said claw couplings being inserted between said second and said third gear pair; said claw couplings being provided with teeth having so inclined front faces that final engagement of the co-operating coupling halves is prevented so long until the originally faster rotating half becomes the slower one and vice versa; a friction clutch between said motor and said driving shaft; a brake on said driving shaft adapted to operate when said friction clutch is released; means for alternately operating the first two claw couplings; means for alternately operating the second two claw couplings; and means in operative connection with said two means for operating said claw couplings adapted to cause release of said friction clutch and operation of said brake whenever a speed change from a slower to a faster speed of said driven shaft is perfected.

KARL MAYBACH.